April 12, 1932.    E. G. SIMPSON ET AL    1,853,467
HEADER CHANNEL OR WEATHER STRIP
Filed June 13, 1928
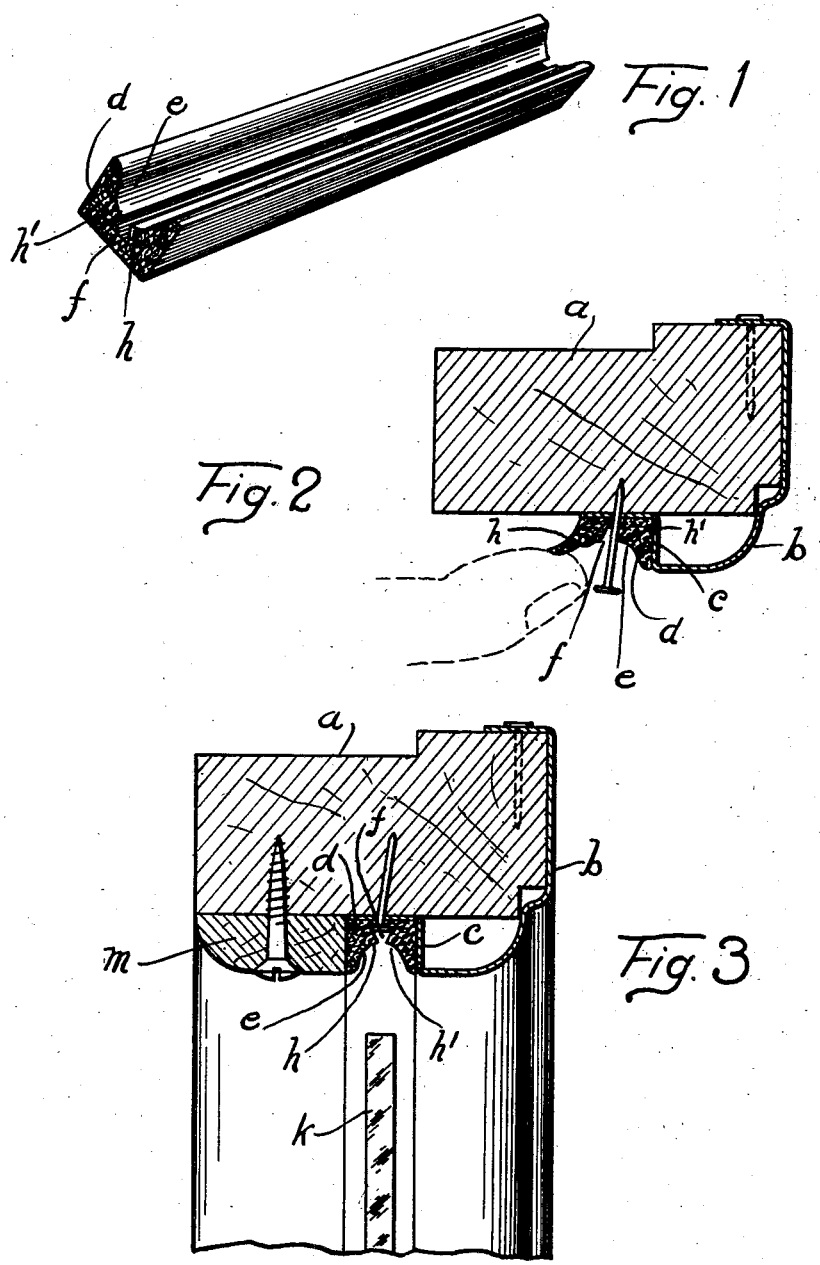
INVENTORS
Emory G. Simpson
and Reese Beynon
BY
ATTORNEY.

Patented Apr. 12, 1932

1,853,467

UNITED STATES PATENT OFFICE

EMORY G. SIMPSON, OF DETROIT, MICHIGAN, AND REES BEYNON, OF CHICAGO, ILLINOIS, ASSIGNORS TO GENERAL MOTORS CORPORATION, OF DETROIT, MICHIGAN, A CORPORATION OF DELAWARE

HEADER CHANNEL OR WEATHER STRIP

Application filed June 13, 1928. Serial No. 284,907.

This invention relates to header channels or weather strips for use in automobile bodies. It is the object of the present invention to afford a channel strip of improved construction which may be easily nailed to the header bar without distorting or puckering the header strip, and which will automatically cover the nail heads with a cushioning material when the glass panel jams into the header strip.

In the drawings:

Fig. 1 is a perspective of the strip.

Fig. 2 is a section showing the strip being nailed in place.

Fig. 3 is a section showing the strip after it has been nailed in place and the garnish molding applied.

$a$ designates the header bar of an automobile door, $b$ the upper panel which is folded to provide a molding or window stop $c$. $d$ designates a sponge rubber header strip. By constructing it of sponge rubber the strip is very yieldable. Its upper face has a U-channel or concave channel $e$ and the bottom of which is a dove-tail groove $f$ which acts as a nailing groove. This has two very useful purposes; one is that it permits the flanged header strip to be drawn away, as shown in Fig. 2, the nail inserted and driven home; and secondly, it removes the nails from contact with the top of the glass and the glass is arrested before it contacts with the top of the nail. This is particularly true due to the dove-tail shape of the groove. This provides protruding lips $h$ and $h'$ which are adapted to engage the top of the glass $k$. Any tendency of the top of the glass to bear down on the nail heads causes the easily distortable sponge rubber lips to draw in or fold over the top of the nail head and consequently prevents the glass edge from striking the nail head and chipping. This is especially true because the window stop $c$ and the garnish molding $m$ prevents any distortion of the sponge rubber channel outwardly. The tendency of the lips must be to draw in over the nail heads.

Another very useful function is that the groove makes the channel at this point relatively thin and consequently when the nail is driven in with the head tight against the channel it does not have the tendency to draw or pucker the entire channel, as has been the case with felt or rubber channels heretofore constructed and nailed in place.

What we claim is:

1. A header channel strip for automobile bodies, comprising a channel member constructed of distortable material having a glass-receiving recess at the bottom of which is a subsidiary nailing recess.

2. A glass-receiving channel for use in the header of automobile bodies, comprising a strip of distortable material having a channel to permit nailing.

3. A channel header strip for receiving the top edges of sliding glass panels, comprising a sponge rubber strip having a glass-receiving channel at the bottom of which is a nailing channel.

4. A glass-receiving header channel for sliding window panels, comprising a sponge rubber strip having at its bottom a dove-tail nailing channel.

5. A glass-receiving header for sliding window panels, comprising a strip of distortable material provided with a nailing portion and also arranged for drawing a cushioning portion in over the nail heads when the glass panel jams up into the strip.

6. A glass-receiving header channel for sliding window panels, comprising a channel strip of distortable material provided with lips arranged to be drawn in over the nailing portion of the strip when the glass panel jams up into the strip.

7. A window glass header strip comprising a strip of soft distortable material provided with a nailing groove running longitudinally and arranged to prevent the glass edge jamming against the nail-heads when the glass is jammed against the header strip.

8. A window glass header strip comprising a strip of sponge rubber provided with a nailing groove running longitudinally and arranged to prevent the glass jamming against the nail-heads when the glass is jammed against the header strip.

9. A window glass header strip for use in packing and cushioning the top of a sliding window with a free upper edge, comprising a longitudinally running strip of sponge rubber having along its mid portion a dovetail-like groove through which nails may be driven for fastening the strip to the window header, the upper walls of the groove tending together and serving to engage the free upper edge of the sliding glass and to cushion the same to avoid contact of the glass with the nail heads.

In testimony whereof we affix our signatures.

EMORY G. SIMPSON.
REES BEYNON.